United States Patent [19]

Parkinson

[11] 3,936,407
[45] Feb. 3, 1976

[54] COATED METAL FASTENERS
[75] Inventor: Robert E. Parkinson, Monroeville, Pa.
[73] Assignee: United States Steel Corporation, Pittsburgh, Pa.
[22] Filed: Sept. 23, 1974
[21] Appl. No.: 508,494

Related U.S. Application Data
[62] Division of Ser. No. 295,076, Oct. 4, 1972, Pat. No. 3,853,606, which is a division of Ser. No. 107,864, Jan. 19, 1971, abandoned.

[52] U.S. Cl. ...................... 260/27 R; 260/29.6 XA
[51] Int. Cl.² ........................................ C08L 93/00
[58] Field of Search ................ 260/27 R, 29.6 XA; 117/132 X

[56] References Cited
UNITED STATES PATENTS

| 3,386,936 | 6/1968 | Gordy | 260/27 R |
|---|---|---|---|
| 3,440,199 | 4/1969 | Lindemann | 260/29.6 |
| 3,440,200 | 4/1969 | Lindemann | 260/29.6 |
| 3,823,108 | 7/1974 | Bissot | 260/27 R |

Primary Examiner—M. J. Welsh
Assistant Examiner—William Parker

[57] ABSTRACT

Coated nails and other driven fasteners designed to increase the force required to withdraw the nail, screw, tack, staple, or other fastener from wood or similar materials, are disclosed. The coating for the metal fasteners is an emulsion or rosin or a rosin-like resin in an ethylene co- or terpolymer.

3 Claims, No Drawings

COATED METAL FASTENERS

This is a division of application Ser. No. 295,076, filed Oct. 4, 1972, which is a division of application Ser. No. 107,864, filed Jan. 19, 1971.

BACKGROUND OF THE INVENTION

Coatings for nails have long been known to the art. These coatings usually consist of rosin or rosin-like resins which are applied to the nail from organic solvent solution. Such coatings are brittle, have poor adhesion to the nail and in most cases, contribute little to the holding power of the nail. In those few cases where a measurable increase does occur immediately after driving the nail, such increase is lost after aging for several weeks or months.

Other types of nail coatings are also known, as for instance, thermosetting resins which set due to the heat generated by the friction of driving the nail. When, as in a nailing machine, the nail is driven the full length in one blow, these coatings give good holding power. However, in manual driving, such a coating is not effective.

Coatings have also been employed to prevent rusting of steel nails, or to act as a lubricant, but no coating is known to the art which combines the properties of increased holding power, corrosion resistance and lubrication.

It is thus an object of my invention to effect an increase in the holding power of driven fasteners. Further objects of my invention are (1) to improve the ease of driving fasteners, (2) to provide excellent corrosion protection for driven fasteners, (3) to provide an attractive coating for driven fasteners useful for identification or aesthetic purposes, (4) to provide a coating for driven fasteners which is easily applied from aqueous dispersion, (5) to provide a coating for driven fasteners which is more tolerant of contamination of the surface of said fasteners, and (6) to provide a coating which can be used as an adhesive for bonding or collating fasteners.

SUMMARY OF THE INVENTION

Accordingly, I have provided a metal fastener having a coating which consists of a combination of two thermoplastic resins; a flexible, carboxyl or substituted carboxyl containing ethylene copolymer or terpolymer, blended with a rosin-like resin which is hard and brittle at room temperature but which melts at a moderately high temperature such as that generated instantaneously at the surface of a nail while being driven.

The rosin-like resin is dispersed in the ethylene copolymer matrix and the dispersion coated onto the fastener and dried. At the temperature reached in driving the fastener, the rosin-like resin liquifies and wets the wood or like material in which the fastener is being driven thus providing a stronger bond. The ethylene copolymer matrix functions as a toughener, flexibilizer and promotes adhesion to the metal fastener. This combination, by providing increased adherence both to the metal fastener and to the wood or similar material effects significant increase in the holding power of the driven fastener. This particular coating composition also provides other important benefits such as corrosion protection and an attractive color useful for identification or aesthetic purposes. Further, since the coating is a good detergent in itself, the usual step of cleaning the surface of the fasteners may be simplified or dispensed with.

DETAILED DESCRIPTION

The fastener has three essential elements; the metal fastener itself and a two element coating consisting of a dispersion of a rosen-like resin in an ethylene copolymer. the metal fastener may be any one of that class of fasteners which are driven and which are subjected to frictional forces sufficient to give an instantaneous surface temperature of at least 60°C. Thus, nails, wood screws, tacks and staples or other fasteners are contemplated. The metallic fastener is usually made of steel, however, our coating composition is also useful for coating metal fasteners other than steel, such as for instance, aluminum nails.

The coating composition is a collodial dispersion of a rosin-like resin and an ethylene co- or terpolymer. The ethylene copolymers or terpolymers suitable for use are those having a hydrocarbon chain structure where from about 10 to about 40 percent by weight of the copolymer consists of substituent groups containing carboxyl groups or esterified carboxyl groups. Suitable carboxyls are the ethylenically unsaturated carboxylic acids such as acrylic, methacrylic, crotonic, isocrotonic, vinyl acetic, and allylacetic acids. Preferred carboxyl groups are derived from acrylic acid and methacrylic acid. Suitable esterified carboxyl groups are the ethylenically unsaturated esters of carboxylic acids which are free from groups which are reactive with the rosin or rosin-like resin, such as allyl, vinyl crotonyl acetate, and allyl, methyl, ethyl, or butyl acrylate. Preferred esterified carboxyl groups are derived from the alkyl acrylates where the alkyl group is lower alkyl and preferably has 1 to 3 carbon atoms in the chain, and vinyl acetate. In a preferred embodiment of the invention, sufficient alkaline soluble substituent groups are contained in the hydrocarbon ethylene chain to allow the polymer to be hydrolyzed under alkaline conditions. Ethylene acid copolymers containing from about 18 to about 24 weight percent of copolymerized acrylic acid are especially suitable. The acid groups react with hot aqueous alkali solutions to form salts which in water dissolve to form collodial solutions resembling soaps. It is desirable to use copolymers with high melt indices, (per ASTM D 1238-52T) preferably at least about 300 because such copolymers can be dissolved at lower temperatures and have a higher fluidity at the elevated temperatures produced on driving, thus providing superior wetting and superior adhesion. Although somewhat poorer results are obtained, copolymers with lower melt indices such as 30 or lower may be used.

The ethylene copolymer may be fluidized any suitable means such as by emulsifying in a colloid mill, by dissolving in a hot organic solvent or preferably by dispersing in an aqueous solution of a volatile alkali. The first two methods are used where the ethylene co- or terpolymer is not soluble in aqueous alkali: the later preferred method is used when soluble polymers are employed. When volatile alkali solutions are used the salt formed by reaction of the acid groups on the polymer and the alkali may be returned to the acid form by heating to drive off the water and the volatile alkali, thus providing a simple means of coating the fastener. Any suitable volatile alkali may be used; however, I prefer to use aqueous ammonia or a volatile water soluble amine or such as for example ethanol amine, diethyl amine, or morpholine or mixtures thereof.

The second element of the coating is rosin or rosin-like resins such as polyhydrocarbon resins, pitch, fossil resins or mixtures of these and similar resins. The characteristics of these rosin-like resins making them useful in the coating are (1) sufficient hardness at room temperature to contribute some shear strangth to the bond and (2) a melting point in the range of from about 60°C to about 150°C enabling the resin to wet the material into which the fastener is being driven. Many organic and inorganic resins have these necessary properties and thus, while the following are deemed most suitable for use, it should be understood that all resins having the above properties may be used.

Rosin is a solid resinous material that occurs naturally in the oleoresin of pine trees. It is a complex mixture of mainly abietic acid and small amount of non-acidic components. Rosin is generally translucent, brittle at room temperature and is insoluble in water. Chemical treatment such as hydrogenation, dehydration or polymerization increases the stability and improves the physical properties of rosin through modification of the phenanthrene-derived moiety; the products are known as modified rosins. Unmodified and modified rosins may also be converted to carboxyl acid derivatives. Rosin, modified rosins, and rosin derivatives having a melting point in the range of about 60°C to 150°C are suitable for use in the present invention.

Hydrocarbon resins are defined as the readily thermoplastic polymers of low molecular weight derived from coal tar fractions, from deeply cracked petroleum distillates and from turpentine. The average molecular weight of these resins usually falls below 2000.

The coal tar hydrocarbon or indene-coumarone resins are readily fusible low molecular weight resins varying in color from light yellow to dark brown. Although soft balsams melting at 60°C and below are not suitable, the higher melting indene-coumarone resins are hard and brittle at room temperature and are suitable for use in the present composition. Coumarone is a minor component, probably less than 10% of the resin formers. Methylindenes, styrene, vinyl toluenes and methylcoumarin are also present in the coal tar oils; the resins contain all these materials as copolymers or as mixtures of polymers.

The useful petroleum resins are low molecular weight hydrocarbon resins, readily thermoplastic and containing a blend of many chemicals. They are derived by the catalytic polymerization of deeply cracked petroleum stocks. Useful petroleum resins are usually below 2000 in average molecular weight and usually have a softening point of between 100° and 120°C. Some petroleum resins are also available in emulsion form; anionic, cationic or nonionic forms are available and all are useful in the present composition. The aromatic resin formers are the same as those in coal tar oils, except that coumarone and its homologs are not present. Butadiene is among the products formed, as are isoprene, 1,3-pentadiene and the pentylenes. Higher diolefines and a large amount of cyclopentadienes are formed.

Cyclopentadiene resins are, strictly speaking, also petroleum resins, but are usually considered separately because of the difference in properties. Dicyclopentadiene resins are of low molecular weight; the trimer of dicyclopentadiene melts at 68°C. Cyclopentadiene may be added to increase the hardness of petroleum resins produced from aliphatic dienes. A cyclopentadiene concentration of 5% increases the softening point of the resulting resin 5° to 10°C. Resins melting up to 180°C can be made from high purity dicyclopentadiene, however, most of the commercially available resins melt at about 100° to 120°C.

Polyterpene resins have also been found to be useful. The most important cerpene resins are polymers of β-pinene, which is found in turpentine. When subjected to ionizing radiation, β-pinene forms a polymer, a portion of which is insoluble in the pinene. The portion soluble in chloroform has a molecular weight of 1500 and a softening point of 150° to 163°C and is useful in the coating composition. Dipenene or its optically active form, limonene, will also polymerize. The dipenene however must be of high purity or it will not form a hard resin. The manufacture of commercial resin is carried out in an aliphatic solvent using aluminum chloride catalyst. The catalyst is removed by acid, neutral and alkaline washes followed by heating to 150° to 200°C and finally steam distillation to remove the solvents and the terpene oils that have formed. The resulting resin is graded by its Ring and Ball softening point. Useful in the present invention are those grades having a Ring and Ball softening point of between about 60°C and 150°C. The 85°C softening grade is preferred.

The terpene polymers have a narrow distribution, and fractions varying in molecular weight of from 550 to 2200 and having a softening point of from 150° to 76°C are contained in the 115°C softening point commercial resin of average molecular weight of 1200.

α-pinene (85%α), wood or gum turpentine, or commercial dipenene (which contains only about 15% dipenene) may also be polymerized to yield a resin having a softening point from 40° to 180°C and a molecular weight from 850 to 3000. Those grades having a Ring and Ball softening point of between about 60° and 150°C are suitable for use in the present invention.

Coal tar pitch is also useful in the composition where light color is not important. Pitch is the residue remaining after the distillation of coal tar. Grades of pitch suitable for use are those having Ring and Ball softening points above about 60°C and are usually identified as soft pitch (up to 75°C), medium hard pitch (85° to 95°C) and hard pitch (above 95°C).

Naturally occurring fossil resins may also be used as for example dammars, East India, copals, accroides, and sandarac. Those grades which are hard at room temperature and which melt at between about 60°C and 150°C are suitable for use in the coating composition.

In preparing the coated fasteners by a preferred embodiment, the first step is to form a dispersion of the ethylene copolymer. The ethylene copolymer resin is placed in a pressure vessel with a stoichiometric amount of alkali to react with the carboxyl groups. When the resin used is the preferred ethylene acrylic acid copolymer and the alkali is the preferred aqueous ammonia, the mixture is heated to from about 90° to 130°C until the resins dissolve, giving a soap-like solution. We prefer to use solutions containing from about 18 to about 24 percent solids because of the low viscosity of such solutions. Alternatively, the ethylene copolymer may be dissolved in a heated solvent or emulsified in a colloid mill, or by other means.

When the ethylene copolymer has been dispersed, the rosin-like resin which has previously been dissolved in an organic solvent is emulsified into the copolymer solution. The organic solvent, when emulsified, also assists in wetting oily metal fasteners. Toluene is an acceptable organic solvent. Diacetone alcohol adds stability to the resulting emulsion.

The ethylene acrylic acid copolymer solution is placed in a drum or kettle equipped with a high shear mixer. The solution of the rosin-like resin is then slowly added to the ethylene copolymer solution with vigorous stirring to thoroughly emulsify it. Surfactants may be added prior to the rosin-like resin addition to assist emulsification and prevent foaming. It is also preferred to add butanol or other alcohol to reduce foaming and obtain a smoother coating. If pigments are to be added to the coating, they are added after the rosin-like resin has been emulsified. Make-up water is added to dilute the solution to the proper solids concentration.

The total resin solids in the coating composition should be between about 20 and about 40 weight percent of the emulsion, preferably from about 25 to about 30 weight percent. Of the total resin solids, from about 20 to about 50 weight percent should be derived from the ethylene co- or terpolymer, preferably from about 25 to about 33 weight percent. The minimum amount of copolymer specified is necessary to provide flexibility to the coating. It is not economically advantageous to use more than the maximum amount specified.

The dispersion is then ready for coating on the metal fastener. In applications which do not require the maximum holding power obtainable using the novel coating, the fasteners may not need to be cleaned prior to coating since the coating itself is a good detergent. Coatings applied to nails which have not been previously cleaned are neither as smooth nor as bright nor is the holding power as high as that with clean nails. Where maximum holding power is desirable, it is necessary to clean the fastener prior to coating. In one embodiment, my coating is applied to nails as they come from the vapor degreaser. The nails travel on a vibrating conveyor through a warm coating solution. After coating, the nails travel to a drying station where the nails are heated to at least about 300°F to dry and bake the coating. It has been found advantageous to maintain the coating solution at a temperature of from about 140° to about 180°F to better wet the nails and to assure rapid and more uniform drying. It is not necessary however to use either hot nails or a hot solution. Satisfactory results are obtained when both nails and solution are at room temperature.

Other methods of pre-cleaning the nails may also be used, such as spray washing the nails with an alkaline or emulsion detergent. The following experiments illustrate the results obtained when specific coating compositions are applied to several types of nails and driven into two types of wood. These experiments are to be understood as being merely illustrative and in no way limiting.

EXAMPLE 1

Coating compositions are prepared using an ethylene copolymer in conjunction with several different rosin-like resins. The coating compositions are then coated on fasteners of several different metals driven into either Ponderosa pine or Douglas fir and the results are analyzed.

The ethylene copolymer used in all instances is a copolymer of ethylene and acrylic acid where the acrylic acid constitutes 20% of the weight of the copolymer. The density of the copolymer is 0.96 and the melt index 300. In composition No. 1 the ethylene copolymer is emulsified with a resin prepared esterifying pentaerythritol with rosin yielding an ester resin having a softening point of 105°C. In composition No. 2 the same ethylene acrylic acid copolymer is emulsified with a hydrocarbon resin having a Ring and Ball softening point of 145° to 155°C, a molecular weight of 600 to 1000 and an acid number of from 0 to 2. In composition No. 3 the ethylene acrylic acid copolymer is combined with a polyterpene resin having a Ring and Ball softening point of 131 and an acid number of 0. Composition No. 4 has the same ingredients as composition No. 3 but a different solids content.

The procedure for preparing the coating compositions is as follows. One hundred parts by weight of the ethylene acrylic acid copolymer are placed in a closed vessel with 21.5 parts by weight ammonium hydroxide (28% $NH_3$) and 378.5 parts by weight of water. The mixture is stirred, heated to 100°C, and held at this temperature for about 1 hour or until the copolymer is dispersed. In a separate vessel the rosin-like resin is dissolved in toluene and held at a temperature of 27°C. Diacetone alcohol is added to the rosin-like resin solution and the rosin-like resin solution is added to the copolymer dispersion slowly and with high shear mixing. Sufficient make-up water is added to give a coating composition with the desired total resin solids. The following table shows the quantitative composition of the four coatings.

Table 1

| Component | Coating 1 | 2 | 3 | 4 |
|---|---|---|---|---|
| Ethylene acrylic acid copolymer (20% solids ammonium solution) | 500ml | 500ml | 500ml | 500ml |
| Pentaerythritol resin ester resin | 333g | | | |
| Hydrocarbon resin | | 250g | | |
| Polyterpene resin | | | 250g | 250g |
| Toluene | 167ml | 167ml | 125ml | 125ml |
| Diacetone alcohol | 33ml | 25ml | 25ml | 25ml |
| Make-up water | 700ml | 300ml | 350ml | 475ml |
| Resin solids, approx. | 31% | 35% | 35% | 31% |

EXAMPLE 2

Cleaned common 8d steel nails are dipped in the coating compositions of Example 1, dried and driven manually into Ponderosa pine and Douglas fir. The pull-out strength or holding power of the nails is measured on a tensile testing machine immediately after driving and after aging for 16 weeks as shown in Table 2.

Table 2

| Immediate Holding Power | Uncoated Nail | Coating 1 | 2 | 3 | 4 |
|---|---|---|---|---|---|
| Pine | 208 | 330 | 315 | 370 | 451 |

Table 2-continued

| Immediate Holding Power | Uncoated Nail | Coating 1 | 2 | 3 | 4 |
|---|---|---|---|---|---|
| Fir | 213 | 605 | 702 | 593 | 639 |
| Aged Holding Power | | | | | |
| Pine | 202 | 376 | 332 | 390 | 477 |
| Fir | 127 | 428 | 545 | 438 | 426 |

EXAMPLE 3

The following nail coating composition is prepared using the ethylene acrylic acid copolymer used in compositions 1–4 in combination with a mixture of rosin-like resins. Following the procedure in Example 1, the ethylene acrylic acid copolymer is dissolved in a solution of aqueous ammonia to give a 20% solids solution. A polyterpene resin having a Ring and Ball softening point of 85°C and an acid number of approximately 0 and a hydrocarbon resin having a Ring and Ball softening point of 145° to 155°C and molecular weight of 600 to 1000 and an acid number of 0 to 2 are dissolved in toluene. Diacetone alcohol is added to the rosin-like resin solution and the rosin-like resin solution is emulsified in the ethylene acrylic acid copolymer. Make-up water is added to give the desired solids content. The quantitative composition of this coating is given in Table 3.

Table 3

| Component | Parts by Weight |
|---|---|
| Ethylene acrylic acid copolymer (20% solids ammonium solution) | 175 |
| Polyterpene resin | 75 |
| Hydrocarbon resin | 25 |
| Toluene | 75 |
| Diacetone alcohol | 10 |
| Make-up water | 120 |
| | 480 |
| Solids content | Approx. 28% |

EXAMPLE 4

Several types of nails are dipped in composition No. 5, dried and driven into Ponderosa pine or Douglas fir. The pull-out strength or holding power of the nails is measured on a tensile testing machine immediately after drying. The results are recorded in Table 4.

Table 4

| Type of Nail | Common 8d Steel Nail Cleaned | Common 8d Steel Nail Not Cleaned | Galvanized 8d Steel Nail | Screw Shank 8d Steel Nail | Common 8d Steel Nail Cleaned |
|---|---|---|---|---|---|
| Method of Driving | Manual | Manual | Manual | Manual | Machine |
| | | Douglas Fir | | | |
| Holding power (pounds) | | | | | |
| Not coated | 242 | 162 | 253 | 268 | 381 |
| Coated | 649 | 491 | 392 | 635 | 600 |
| | | Ponderosa pine | | | |
| Holding Power (pounds) | | | | | |
| Not coated | 185 | 193 | 184 | 199 | 269 |
| Coated | 388 | 451 | 299 | 413 | 607* |

*Considerable amount of wood fiber adhering to nail after withdrawal.

I claim:

1. A coating composition particularly useful for coating on nails comprising an emulsified mixture of:
   a. from about 50 to about 80 percent by weight of resin solids of rosin or a rosin-like resin which melts at a temperature of from about 60°C to about 150°C, dissolved in an organic solvent; and
   b. from about 20 to about 50% by weight of resin solids of an ethylene copolymer or terpolymer comprising from about 60 to about 90 percent by weight ethylene and from about 10 to about 40 percent by weight of an ethylenically unsaturated carboxylic acid or an ester thereof free of groups which are reactive of said rosin or rosin-like resin, said ethylene copolymer or terpolymer dissolved in a hot volatile aqueous alkali solution.

2. The composition of claim 1 wherein the total resin solids is from about 20 to about 40 weight percent of the emulsion.

3. The composition of claim 1 wherein the rosin or rosin-like resin comprises from about 67 to about 75 percent by weight of the total resin solids.

* * * * *